United States Patent
Wiech et al.

(10) Patent No.: US 10,434,866 B2
(45) Date of Patent: Oct. 8, 2019

(54) RADIATOR SHUTTER FOR A MOTOR VEHICLE

(71) Applicant: GM GLOBAL TECHNOLOGY OPERATIONS LLC, Detroit, MI (US)

(72) Inventors: Thomas Wiech, Russelsheim (DE); Fabian Fuerst, Russelsheim (DE)

(73) Assignee: GM GLOBAL TECHNOLOGY TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/625,564

(22) Filed: Jun. 16, 2017

(65) Prior Publication Data

US 2017/0361699 A1    Dec. 21, 2017

(30) Foreign Application Priority Data

Jun. 16, 2016   (DE) .................. 10 2016 007 369

(51) Int. Cl.
| | | |
|---|---|---|
| *B60K 11/00* | (2006.01) | |
| *B60K 11/04* | (2006.01) | |
| *B60K 11/08* | (2006.01) | |
| *B60K 11/02* | (2006.01) | |

(52) U.S. Cl.
CPC .............. *B60K 11/04* (2013.01); *B60K 11/02* (2013.01); *B60K 11/085* (2013.01); *Y02T 10/88* (2013.01)

(58) Field of Classification Search
CPC ....... B60K 11/04; B60K 11/02; B60K 11/085; B60K 11/08; B60K 11/00
See application file for complete search history.

(56) References Cited

U.S. PATENT DOCUMENTS

| | | | | | |
|---|---|---|---|---|---|
| 4,410,032 | A | * | 10/1983 | Mori ................... | B60K 11/085 123/41.06 |
| 7,703,839 | B2 | * | 4/2010 | McKnight ............ | B60K 11/085 296/180.5 |
| 7,717,208 | B2 | * | 5/2010 | Knauer ................ | B60K 11/085 180/68.1 |
| 8,136,487 | B2 | * | 3/2012 | Bernt ................... | B60K 11/085 123/41.05 |
| 8,181,727 | B2 | * | 5/2012 | Ritz ..................... | B60K 11/085 180/68.1 |
| 8,302,714 | B2 | * | 11/2012 | Charnesky ........... | B60K 11/085 180/68.1 |

(Continued)

FOREIGN PATENT DOCUMENTS

| | | |
|---|---|---|
| DE | 102008013420 A1 | 9/2009 |
| DE | 102011006114 A1 | 9/2012 |

(Continued)

OTHER PUBLICATIONS

German Patent and Trade Mark Office, German Search Report for German Patent Application No. 10 2016 007 369.1, dated Mar. 31, 2017.

*Primary Examiner* — James M Dolak

(74) *Attorney, Agent, or Firm* — Lorenz & Kopf, LLP

(57) ABSTRACT

A radiator shutter for a motor vehicle includes a carrier, which has a cross-sectional surface, through which air can flow, at least one lamella, which is arranged on the carrier, and which has a longitudinally extended flexible and elastic bending rod and at least one planar segment, wherein the planar segment is connected to the bending rod along a side edge.

13 Claims, 7 Drawing Sheets

(56) References Cited

U.S. PATENT DOCUMENTS

| | | | | |
|---|---|---|---|---|
| 8,316,974 | B2* | 11/2012 | Coel | B60K 11/085 |
| | | | | 165/44 |
| 8,646,552 | B2* | 2/2014 | Evans | B60K 11/085 |
| | | | | 180/68.1 |
| 9,096,278 | B2* | 8/2015 | Lee | B60K 11/085 |
| 9,610,835 | B2* | 4/2017 | Nam | F16H 19/02 |
| 10,040,344 | B2* | 8/2018 | Schoning | B60R 19/48 |
| 10,093,173 | B1* | 10/2018 | Frayer | B60K 11/085 |
| 10,144,278 | B2* | 12/2018 | Schmitt | B60K 11/085 |
| 10,293,681 | B2* | 5/2019 | Vacca | B60K 11/085 |
| 2008/0289794 | A1* | 11/2008 | Leitch | B60K 11/04 |
| | | | | 165/41 |
| 2015/0158376 | A1* | 6/2015 | Ehrenberg | B60K 11/085 |
| | | | | 180/68.1 |

FOREIGN PATENT DOCUMENTS

| | | | |
|---|---|---|---|
| DE | 102013110467 | A1 | 11/2014 |
| EP | 0982222 | A2 | 3/2000 |
| EP | 2457761 | A1 | 5/2012 |

\* cited by examiner

A-A

B-B

C-C

D-D

E-E

RADIATOR SHUTTER FOR A MOTOR VEHICLE

CROSS-REFERENCE TO RELATED APPLICATION

This application claims priority to German Patent Application No. 102016007369.1, filed Jun. 16, 2016 which is incorporated herein by reference in its entirety.

TECHNICAL FIELD

The present disclosure pertains to a radiator shutter for a motor vehicle for arrangement in a cooling-air intake, for example on a vehicle front. Provision is furthermore made for a motor vehicle body equipped with such a radiator shutter as well as a corresponding motor vehicle.

BACKGROUND

Radiator shutters for arrangement on an air intake in a motor vehicle front serve to close and open a cooling-air supply as needed for a radiator, which is thermally coupled to an internal combustion engine. Provided that a radiator only needs to yield a comparatively small cooling output, namely when the drive also yields only a small output in accordance with the respective driving situation of the motor vehicle, it is not required to apply cooling air to the radiator, which is typically arranged in the area of the vehicle front. To reduce the air resistance of the motor vehicle, provision can be made in such cases for a throttling of the cooling-air supply by operating a radiator shutter. By closing individual lamellae of a radiator shutter, the air flowing against the vehicle front can thus for instance be guided past the air inlet in an aerodynamically favorable manner, when the radiator shutter is closed.

Common radiator shutters have a plurality of displaceable or pivotable components, which can be moved as needed, mostly by separate drives, for example by actuating drives.

DE 10 2008 013 420 A1 discloses an air passage device having a control unit, which includes a plurality of air flaps, which can be pivoted about parallel pivot axes, and a gear rod, which connects the air flaps for a common movement. The air flaps serve the purpose of either closing an opening of a basic assembly of releasing it for throughflow. An electric motor, which is permeated by a drive rod, is further rigidly connected to the basic assembly. The control assembly can be adjusted between a locked flow position and an open flow position by movement of the drive rod by the electric motor.

SUMMARY

In accordance with the present disclosure an improved radiator shutter is provided, which has a particularly simple and robust kinematic and consists of as few individual parts as possible and is as simple, compact and robust as possible, and which provides for a long-term operation with as little maintenance as possible.

The radiator shutter includes a carrier, which has a cross-sectional surface, through which air can flow or against which air can flow. The radiator shutter further includes at least one lamella, which is arranged on the carrier and which has a longitudinally extended flexible and elastic bending rod, as well as a planar segment. The planar segment is connected to the bending rod along a side edge. The planar segment surface typically extends along the longitudinal direction of the bending rod.

Typically, the planar segment is continuously connected to the bending rod along its entire longitudinal extension and is fixed thereto. The lamella can be formed solely by the bending rod and by at least one planar segment, which is fixed to the bending rod. The planar segment and the bending rod can have an approximately identical extension in the longitudinal direction of the bending rod. The bending rod can be configured longer than the planar segment. This provides for a connection of the lamella to the carrier by the bending rod.

In contrast to common radiator shutters, the lamella is arranged on the carrier in a rotatably fixed manner. It can thus not be pivoted between an open and a closed position with respect to the carrier. Instead, provision is made for deformation of the bending rod, with the result that the planar segment, which is connected to the bending rod, carries out a type of pivoting or folding movement. That pivoting or folding movement of the planar segment is controlled by the degree of the geometric deformation of the bending rod.

The planar segment, which represents a planar formation, can have a largely flat, rectangular basic geometry. Along a longitudinal side, the planar segment is connected to the longitudinally extended bending rod. A bending of the bending rod along a predetermined bending direction, which either coincides with the plane of the planar segment or which is oriented approximately vertically to the plane of the planar segment, leads to a deformation for the planar segment in such a way that the planar segment carries out a pivoting or folding movement relative to the bending rod with the bending rod as pivoting or folding axis. According to its pivoting or folding movement, the planar segment only covers a portion of the permeable cross-sectional surface of the carrier of the radiator shutter.

According to a further development, the bending rod has two opposite longitudinal ends, which are in each case arranged on the carrier. The longitudinal ends of the bending rod are in each case fixed to the carrier with respect to a plane, which extends vertically to the longitudinal extension of the carrier. The bending rod is also arranged on the carrier in a rotationally fixed manner. The fixation of the two opposite longitudinal ends of the carrier provides for a particularly compact design of the radiator shutter and of its carrier. Those areas of the carrier, which can accommodate the opposite longitudinal ends of the bending rod, can be configured without control elements for adjusting the lamella and thus in a control element-free manner. This provides for a particularly simple and compact design of the carrier as well as of the entire radiator shutter.

According to a further embodiment, at least one longitudinal end of the bending rod is guided on the carrier so as to be displaceable in the longitudinal direction of the bending rod. On the carrier side, provision can be made for example for a longitudinal guide for a longitudinal end of a bending rod. An arcuate deformation, for example, of the bending rod, which originally runs in a straight line, is made possible by a longitudinal guide. An arcuate deformation of the bending rod typically results in a shortening of the distance between the opposite longitudinal ends of the bending rod. The longitudinal guide on the carrier ensures that the bending rod remains connected to the carrier in spite of a bending or deformation.

According to a further embodiment, the planar segment is subject to a pivoting or folding movement with the bending rod as pivoting or folding axis, as a result of a deformation of the bending rod. The pivoting or folding axis of the planar segment can also be located outside of the bending rod. The imaginary pivoting or folding axis of the planar segment typically extends approximately parallel to the longitudinal extension for the bending rod.

Due to the fact that the planar segment has a much larger extension than the bending rod vertically to the longitudinal extension for the bending rod, it can follow a bending movement or an elastic deformation, respectively, of the bending rod, only conditionally or not at all. It is thus subject to a pivoting or folding movement, when the bending rod is geometrically deformed in a specified manner.

An effective pivoting or folding over of the planar segment to enlarge or reduce a free cross-sectional surface of the carrier, through which air can flow, can also be attained in this manner without pivotably supporting individual lamellae. The provision of at least one lamella, which has a bending rod and a planar segment connected thereto, can carry out a movement, which can be compared to a pivoting, but with the difference that a rotation of the bending rod does not need to be provided for a pivoting or folding over of the planar segment, but only a local geometric deformation of the bending rod.

According to a further embodiment of the radiator shutter, provision is made for a middle section of the bending rod to be capable of being deformed vertically to the longitudinal extension of the bending rod for a pivoting or folding over of the planar segment between a closed position and an open position. The middle section of the bending rod can for example be located approximately in the middle between the opposite longitudinal ends of the bending rod. The middle section, however, can also be a middle area of the bending rod, which extends in the longitudinal direction of the bending rod between the opposite longitudinal ends of the bending rod.

The middle section of the bending rod can be up to 50% or up to 80% of the longitudinal extension of the bending rod. The bending rod, in particular the middle section thereof, cannot only be capable of being deformed vertically to the longitudinal extension of the bending rod, but also vertically to the plane of the planar segment.

It is further possible for the bending rod to be capable of being deformed vertically to a longitudinal extension in a direction, which coincides with the plane of the planar segment. Such a bending of the bending rod has the result that the areas of the planar segment located in the immediate vicinity of the bending rod, are subject to a smaller deformation than those areas of the planar segment, which face away from the bending rod. Due to the geometry, the planar segment must stretch more than the bending rod in response to a bending of the bending rod. As a result of this, the planar segment folds over, because it takes the path of least resistance. A deformation of the bending rod leads to a folding over or pivoting of the planar segment with the bending rod as pivoting or folding axis. It goes without saying that a similar or identical pivoting or folding over of the planar segment can also be brought about in response to a deformation of the bending rod vertically to the plane of the planar segment.

According to a further embodiment, the middle section of the bending rod can be deformed in an arcuate manner with respect to the longitudinal ends of the bending rod fixed to the carrier. In an initial position, the bending rod can extend substantially in a straight line between opposite sections, for instance between opposite legs of the carrier. For a deformation of the bending rod, which causes a pivoting or folding of the planar segment, provision can be made to only deflect the middle section of the bending rod by a predetermined extent in a direction vertically to the longitudinal extension of the bending rod.

The bending rod thereby assumes an arcuate or curved contour. That curvature can be caused in different ways. The arcuate curvature of the bending rod can be reproduced well and accurately, so that a required pivoting or folding behavior of the planar segment can be controlled particularly easily and well.

According to a further embodiment, the middle section of the bending rod is connected to a control element. The control element is thereby guided on the carrier so as to be vertically or transversely displaceable to the longitudinal extension of the bending rod. The bending rod can be bent in an accurate and easily reproducible manner by the control element, which is connected to the bending rod, and its translational guide on the carrier.

According to a further embodiment, a pressure piece, which interacts with at least one longitudinal end of the bending rod, is arranged on the carrier. The bending rod can be compressed by the pressure piece in the longitudinal direction, so as to affect a bending of its middle section. By exerting a pressure, which acts on the bending rod in the longitudinal direction, said bending rod can be deformed along a preferred direction, so that the bending rod is subject to an arcuate deformation, for example due to its fixation of the opposite longitudinal end on the carrier.

The pressure piece itself can be guided in a longitudinally displaceable manner on the carrier, for example. The pressure piece and the longitudinal end of the bending rod, which interacts with the pressure piece, can have run-on slopes, which correspond to one another, so that a translational displacement of the pressure piece leads to a compression of the bending rod, which effects the deformation. In the case of this exemplary embodiment, the middle section of the bending rod can be decoupled from a control element.

Instead of a control element, which interacts with the middle section, only a pressure piece, which is provided on the longitudinal end of the bending rod and which is likewise suitable to affect an arcuate curvature of the bending rod, can therefore be implemented in the case of this embodiment. For this purpose, the embodiment of the bending rod can also have a certain pretension or a certain basic curvature, which leads to a defined, arcuate deformation of the bending rod in response to a compression of the bending rod in the longitudinal direction.

According to a further development, the carrier further has a circumferentially closed frame including at least two opposite legs, on which opposite longitudinal ends of the bending rod are arranged. A first longitudinal end of the bending rod is hereby arranged on a first leg of the frame, while an opposite second end of the bending rod is arranged on a second leg of the frame located opposite the first leg.

A large variety of orientations and arrangements of lamellae and bending rods are hereby possible on the frame. Provision is made for example for the lamellae to run substantially horizontally, i.e. in the transverse vehicle direction (y), with their bending rods in final mounting configuration on the motor vehicle body. In the case of other embodiments of the radiator shutter, however, provision can also be made for an orientation of the lamellae, which is rotated for example by 90°. The lamella and its bending rod can for example also run in the vertical vehicle direction (z).

The frame, which is closed all around, typically forms the cross-sectional surface, through which air can flow. In that one, preferably a plurality of lamellae are arranged in the area of the cross-sectional surface, the entire cross-sectional surface can be open for supplied air to flow through, or can be closed for diverting the air around the carrier, depending on the respective position of the lamellae. The frame, which is closed all around, further provides the radiator shutter with a sufficient level of mechanical stiffness and stability.

According to a further embodiment, a plurality of lamellae, which are oriented parallel to one another, are arranged on the carrier. A distance between lamellae, which are adjacently arranged on the carrier, hereby corresponds approximately to the width or to twice the width of one of the planar segments. The entire cross-sectional surface of the carrier or the entire cross-sectional surface of the frame, respectively, can be closed by lamellae, which are arranged in parallel on the carrier or in parallel on the frame, respectively. By bending the respective bending rods of the lamellae, they or the planar segments thereof, respectively, can be pivoted or folded over into an open position, so that air can flow through the cross-sectional surface of the carrier, thus of the frame.

When providing a plurality of lamellae, which are arranged parallel to one another, all lamellae or all bending rods, respectively, can in each case be mechanically coupled synchronously with the control element, which has already been described above, or with a pressure piece, which has already been described above. An adjusting movement of the control element or of the pressure piece then results in a synchronous movement or adjustment, respectively, of all of the lamellae, which are arranged on the carrier. The mechanical coupling of all lamellae or bending rods, respectively, with one and the same control element or pressure piece provides a particularly simple, permanent and robust mechanical coupling of the lamellae. In the case at hand, comparatively complicated coupling rods, as they are common in the prior art, for example, can be forgone.

According to a further embodiment, a connecting element for forming a releasable connection with a counter connecting element is arranged on at least one side edge of the planar segment of the at least one lamella. The counter connecting element is hereby either located on an adjacently arranged lamella or on the carrier. A closed position of a plurality of lamellae of the radiator shutter can be stabilized and structurally reinforced by connecting elements and counter connecting elements, which engage with one another. Provision is made hereby for a connecting element of a lamella to only engage with a counter connecting element of an adjacent lamella or with a counter connecting element of the carrier in a positive manner, when the respective lamellae are in the closed position.

The connecting elements or counter connecting elements, respectively, can for example be embodied in a hook-like manner, so that they hook into each other when reaching a closed position of the at least one lamella, and thus mechanically stabilize the closed or closure position of the radiator shutter.

According to a further embodiment, provision is furthermore made for two planar segments to be arranged on a bending rod. As a result of a bending of the bending rod, they pivot or fold over in opposite directions. The two planar segments can be oriented in an approximately V-shaped manner relative to one another in a cross-section through the lamella. In that V-position, the planar segments are located in an open position, in which they release at least a partial area of the cross-sectional surface of the carrier for air flowing in.

Due to a bending of the bending rod, the planar segments now pivot in opposite directions, so that an angle, which extends in the cross-section between the planar segments, increases. Provision can be made on the ends of the planar segments facing away from the bending rod for connecting elements or counter connecting elements, so that the planar segments experience a fixation either on an adjacent planar segment or on the carrier or on the frame thereof, respectively, when reaching the closed position.

According to a further development, provision is further made for the bending rod to be made of a thermoplastic plastic. The bending rod can for example be made of polyamide, polypropylene or polyethylene or plastic mixtures formed therefrom and including fiber reinforcement, if applicable. The bending rod can be made as plastic extrusion component or as injection molded component. The planar segment, which is typically connected to the bending rod along its entire longitudinal extension and is fixed thereto, can have an organic sheet or can be made of an organic sheet. Organic sheets identify fiber-reinforced composites, which are typically present as fiber-matrix semi-finished products. They typically have a woven fiber structure or a non-woven fiber structure, which are embedded in a thermoplastic plastic matrix.

Glass, aramide and carbon or carbon as well as natural fibers, respectively, are possible as fibrous material. According to the fiber orientation and fiber geometry, the organic sheet can have anisotropic mechanical and/or anisotropic thermal properties. The pivoting and folding behavior of the organic sheet or of a planar segment formed therefrom, respectively, can be specifically adapted to the intended purpose provided here.

According to a further aspect, provision is further made for a motor vehicle body including at least one air intake, in which an above-described radiator shutter is arranged. The air intake and the radiator shutter are typically located on a front end of the motor vehicle body. Due to the fact that the radiator shutter can be configured to be particularly compact due to its bendable lamellae, a particularly compact and weight-saving design also results for the motor vehicle body.

According to a further aspect, provision is further made for a motor vehicle including such a motor vehicle body or including at least one above-described radiator shutter, respectively. Owing to the radiator shutter, the motor vehicle can be characterized by a small air resistance and by a vehicle weight, which is reduced as compared to the prior art.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
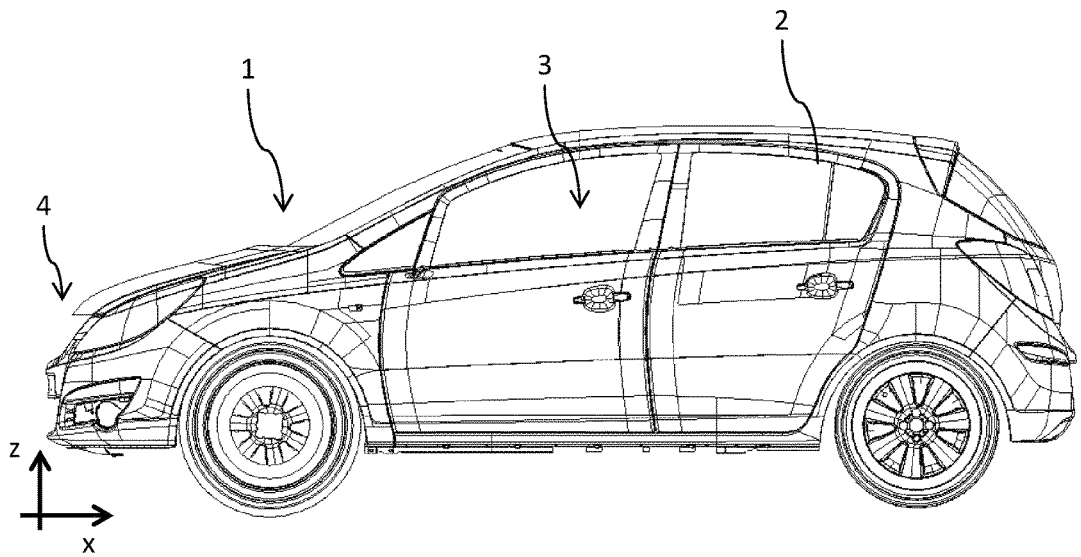
FIG. 1 shows a side view of a motor vehicle embodied as passenger car.
Figure 2:
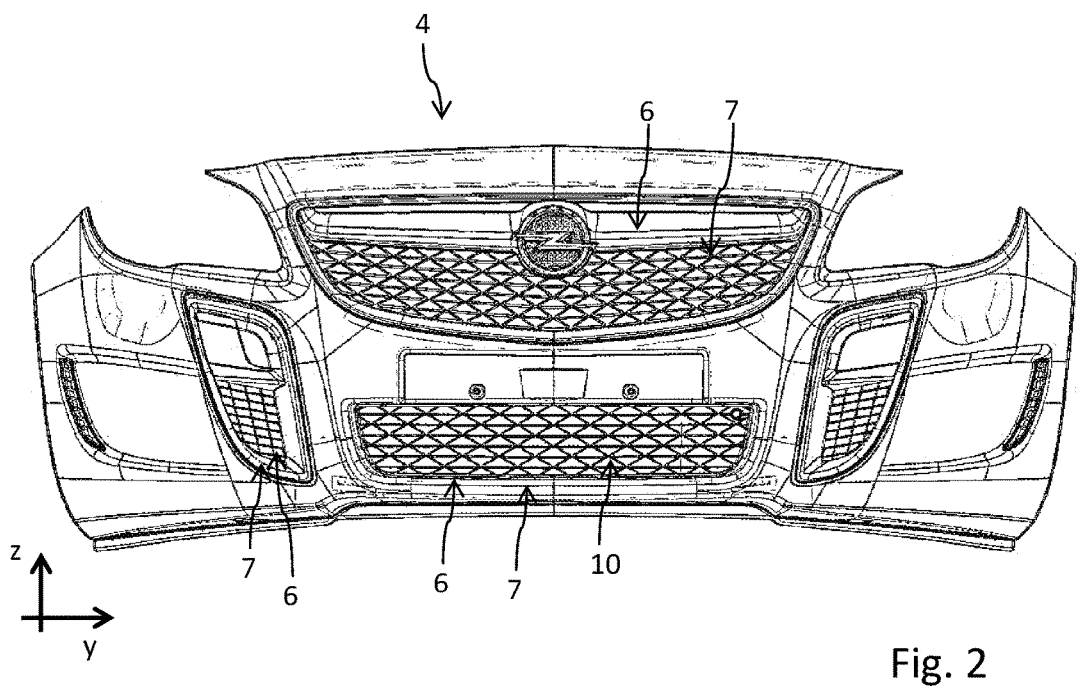
FIG. 2 shows an exemplary front view of a motor vehicle.
Figure 3:
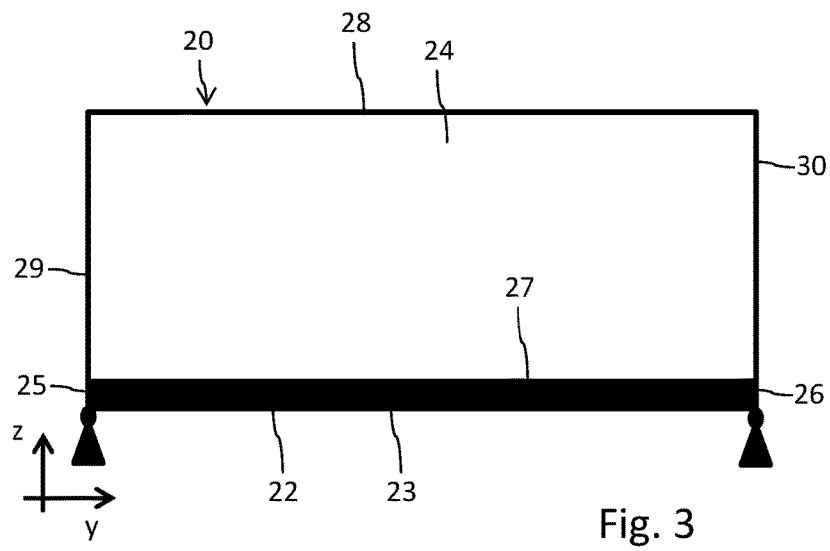
FIG. 3 shows a schematic illustration of an individual lamella of a radiator shutter.
Figure 4:
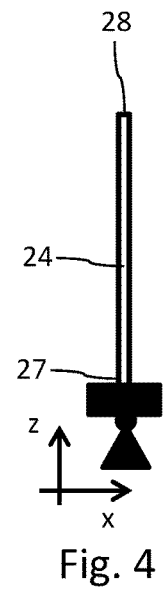
FIG. 4 shows a side view of the lamella according to FIG. 3.
Figure 5:
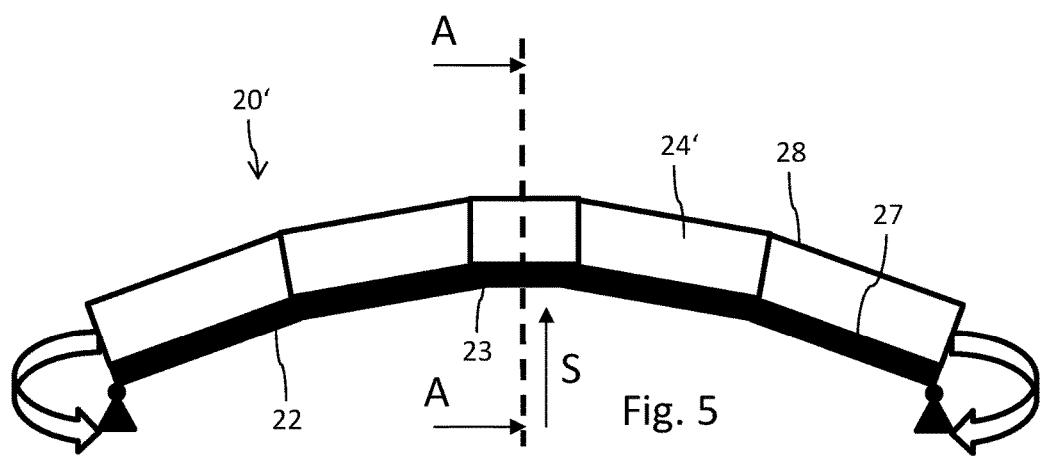
FIG. 5 shows a schematic illustration of a lamella according to FIG. 3; which is deformed as a result of a bending of the bending rod.
Figure 6:
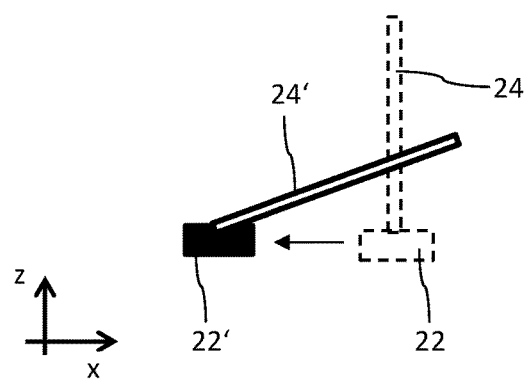
FIG. 6 shows a side view of the lamella according to FIG. 5.
Figure 9:
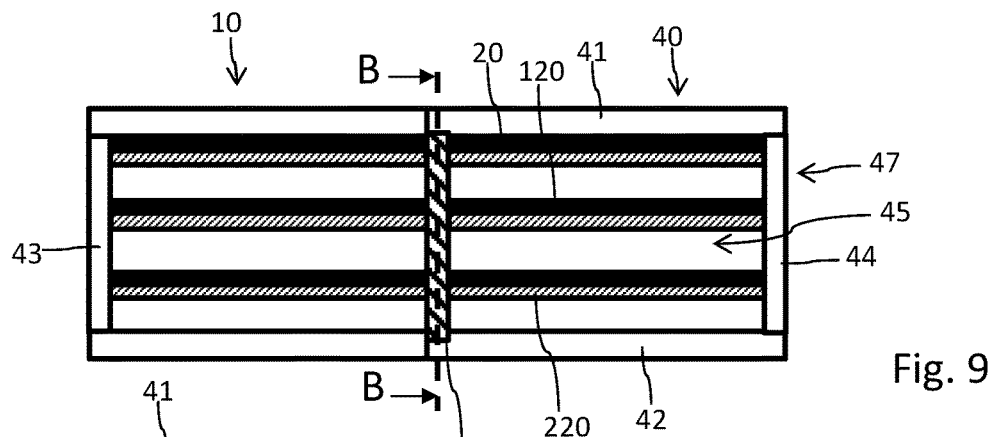
FIG. 9 shows a top view onto a radiator shutter in open position.

The motor vehicle 1 shown in FIG. 1 in side view has a motor vehicle body including an interior 3, which acts as passenger compartment. Towards the front, in driving direction of the motor vehicle 1, the motor vehicle body 2 ends with a vehicle front 4, which is shown schematically in top view in FIG. 2. More specifically, FIG. 2 only shows a front paneling 5 without headlights. In the area of the vehicle front 4, the front paneling 5 has a plurality of air intakes 6. Individual grilles 7, which can have a grille or rhombic structure, are in each case arranged in the area of the air intakes 6. Provision is made in the area of at least one of the air intakes 6 for a radiator shutter 10, which is shown in top view in FIG. 9, for example.

The radiator shutter 10, which is arranged to be offset to the grille 7 or radiator grille, relative to the longitudinal vehicle direction (x), has a circumferential and closed carrier 40. The carrier 40 has a total of four lateral legs 41, 42, 43, 44. The upper and lower legs 41, 42 extend approximately parallel to one another. They are arranged spaced apart from one another by the longitudinal extension of the lateral legs 43, 44, relative to the vertical vehicle axis (z). The lateral legs 43, 44 also extend approximately parallel to one another. It is not imperative for a strict parallel embodiment and arrangement of individual legs 41, 42, 43, 44 to be provided. The carrier 40 with its legs 41, 42, 43, 44 forms a frame 47, on which a plurality of lamellae 20, 120, 220 are arranged.

Figure 12:
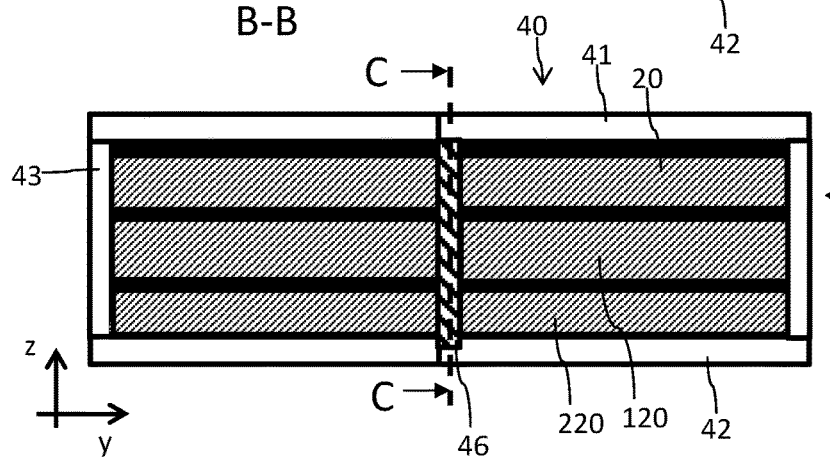
FIG. 12 shows a top view onto a radiator shutter according to FIG. 9, but with lamellae in closed position.

The lamellae 20, 120, 220 extend substantially parallel to one another. As follows from a comparison of the illustrations of FIGS. 9 and 12, the lamellae can be moved or deformed between an open position shown in FIG. 9 and a closed position shown in FIG. 12. In open position according to FIG. 9, supplied air can flow through a cross-sectional surface 45, which is enclosed by the frame 47, in a substantially unhindered manner. In the closed position of the lamellae 20, 120, 220 shown in FIG. 12, the cross-sectional surface 45 is substantially almost completely closed by the lamellae 20, 120, 220. Supplied air is thereby guided past the radiator shutter.

The mode of operation and the setup of the individual lamellae 20 are explained in more detail by FIGS. 3 to 6. The lamella 20 has a longitudinally extended bending rod 22, which is arranged or fixed, respectively, on the carrier 40 of the radiator shutter 10 on opposite longitudinal ends 24, 25. The lamella 20 further has a substantially flat planar segment 24. The planar segment 24 has an approximately rectangular contour. The longitudinal extension of the planar segment 24 corresponds approximately to the longitudinal extension of the bending rod 22. The planar segment 24 is fixedly connected to the bending rod 22 and is immovably fixed on the bending rod 22 along a side edge 27, which faces the bending rod 22. The bending rod 22 and the planar segment 24 can be fixedly connected to one another, for example by material engagement, along the entire side edge 27.

The bending rod 22 is configured in an elastic and flexible manner. Even though the planar segment 24 can also be configured elastically, it tends to pivot or fold over as a result of a bending or deformation of the bending rod, in terms of its geometry. The material, of which the planar segment 24 is formed, cannot be stretched or can only be stretched to an extremely small degree, so that it can only conditionally follow a bending movement of the bending rod 23 or not at all.

A middle section 23 of the bending rod 22 is located between the opposite longitudinal ends 25, 27 of the bending rod. If said middle section is deflected in a direction vertically to the longitudinal extension of the bending rod 22 in accordance with the arrow S according to FIG. 5, the side edge 27 of the planar segment experiences a deformation, which corresponds to the bending rod 22. Due to a comparatively large extension along its longitudinal ends 29, 30, a side edge 28 of the planar segment 24, which faces away from the bending rod 22, is located at a relatively large distance from the bending rod 22.

Due to the geometry of the planar segment 24, due to its extension vertically to the longitudinal direction of the bending rod 22, that side edge 28 cannot be deformed in the same way as the side edge 27. A pivoting or folding movement of the planar segment 24 results in a folded position 24', as it is suggested in FIG. 5 and shown in cross-section in FIG. 6. If the planar segment 24 wanted to remain in the original plane in spite of the deformation of the bending rod 22, said planar segments, in particular its side edge 28, would need to carry out a stretching with respect to the side edge 27. Due to the basic geometry of the planar segment 24 and the elastic properties of the material of the planar segment, however, this is not possible. As a result of the elastic deformation and arcuate bending of the middle area 23 of the bending rod 22, a pivoting or folding movement of the planar segment 24 including a bent-over planar segment 24', as it is shown schematically in FIG. 6, can be effected and controlled.

A pivoting or folding movement of the planar segment 24 including a bent-over or folded planar segment 24' hereby takes place by a bending of the middle section 23 of the originally straight bending rod 22, including a bending rod 22', which is bent in an arcuate manner. The originally straight lamella 20 deforms in a manner, which is shown in the cross-section according to FIG. 6, In the case of the bent lamella 20', the planar segment 24 folds over opposite to the bending direction. The middle section 23 of the bending rod 22 is hereby the subject of a displacement movement with respect to the longitudinal ends 25, 26 of the bending rod in a direction vertically to the plane of the planar segment 24.

Figure 10:
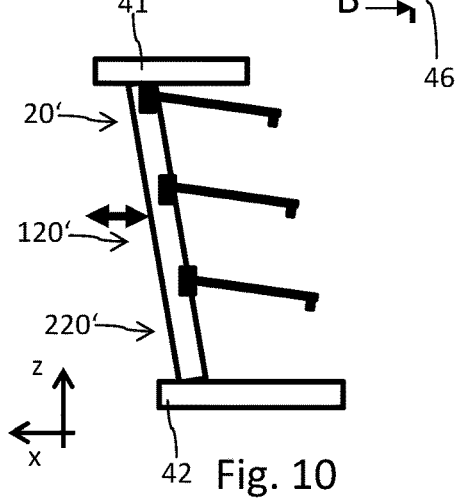
FIG. 10 shows a cross-section B-B according to FIG. 9.
Figure 11:
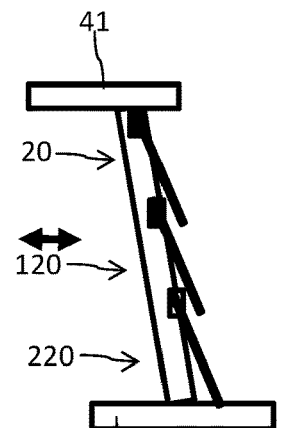
FIG. 11 shows a cross-section C-C according to FIG. 12.

FIGS. 7 to 12 show an embodiment of the radiator shutter 10 with a total of three lamellae 20, 20, 220 each. The lamellae are hereby arranged on top of one another in vertical vehicle direction (z) and slightly offset to one another in longitudinal vehicle direction (x). In their closed position shown in FIGS. 7 and 11, the lamellae 20, 120, 220 are thus oriented almost vertically or slightly inclined at a predetermined angle with respect to the vertical, respectively. The upper ends of the planar segments 24, 124, 224 are thereby in each case connected to a bending rod 22, 122, 222. The bending rods 22, 122, 222 can be connected to one another via a control element 46 and can be coupled synchronously via the latter, as shown in FIGS. 10 and 11, for example.

As can be seen from a comparison of FIGS. 10 and 11, the control element 46 can be supported on the frame 47, at least on two opposite legs 41, 42 or 43, 44, so as to be capable of being displaced vertically to the plane of the cross-sectional surface formed by the frame 47, typically in a translationally displaceable manner. All bending rods 22, 122, 222 of the three lamellae 20, 120, 220 can be deformed synchronously by the control element and can be bent in the specified manner. Due to a deflection of the respective middle section 23 of the bending rods 20, 120, 220, the respective planar segments 24, 124, 224 experience a pivoting or folding movement, which follows from the comparison of FIGS. 7 and 8.

Figure 7:
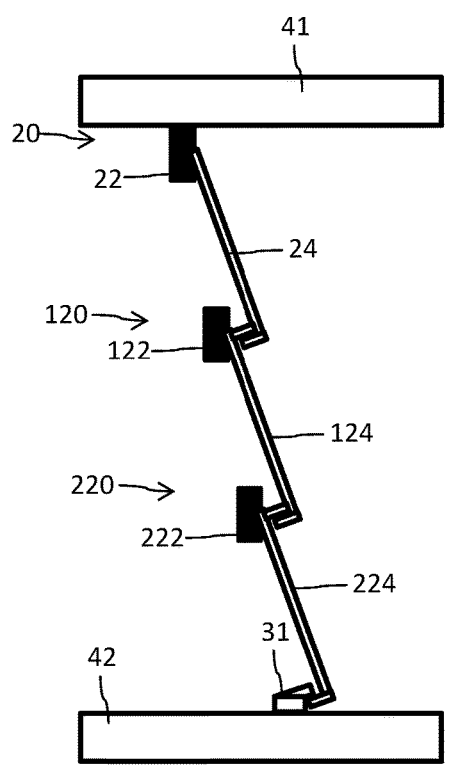
FIG. 7 shows a cross-section through a radiator shutter, which has a total of tree lamellae oriented parallel to one another, which are located in closed position.
Figure 8:
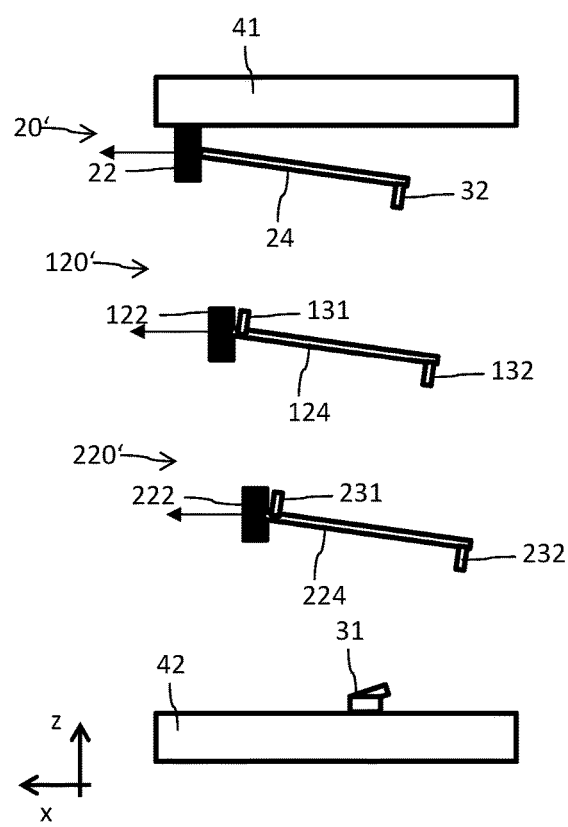
FIG. 8 shows an illustration of the radiator shutter according to FIG. 7, but with the lamellae in open position.

If the bending rods are moved to the left in longitudinal vehicle direction (x), for example based on the configuration according to FIG. 7 with their middle section 23, this leads to a pivoting or folding over, which is directed upwards, of the respective planar segments 24, 124, 222. As illustrated in more detail in FIGS. 7 and 8, provision is in each case made on the opposite side edges 27, 28 of the individual planar segments 24, 124, 224, for individual connecting elements 32, 132, 232 as well as for counter connecting elements 131, 231. A further counter connecting element 31 is arranged for example on the inner side of the lower leg 42 of the carrier.

The connecting elements 32, 132, 232 and the counter connecting elements 31, 131, 231 have geometric contours, which correspond to one another and which engage with one another in a positive manner. The connecting elements 32, 132, 232 and the counter connecting elements 31, 31, 231, which correspond thereto or which are embodied so as to be complementary thereto, can be embodied in a hook-shaped manner, for example.

In the closed position shown in FIG. 7, a connecting element arranged on the lower end of the upper planar segment 24 is in operative connection with a counter connecting element 131 arranged on the upper end of the middle planar segment 124. In the closed position, a connecting element 132 provided on the lower end of the middle planar segment 124 is equally in operative connection with a counter connecting element 231, which counter connecting element 231 is located on the upper end of the lower planar segment 224. Finally, provision is made on the lower end of the planar segment 224 for a further connecting element 232, which is coupled and connected to the counter connecting element 31 of the lower leg 42 in closed position according to the FIG. 7.

The radiator shutter 10 can be arranged on the motor vehicle in such a way that an opening movement of the individual lamellae in driving direction of the motor vehicle, and thus opposite to an impact pressure of the head wind, takes place. The head wind thereby holds the lamellae in closed position. However, it is otherwise also conceivable that the lamellae 20, 120, 220 are held in open position by the head wind.

Figure 13:
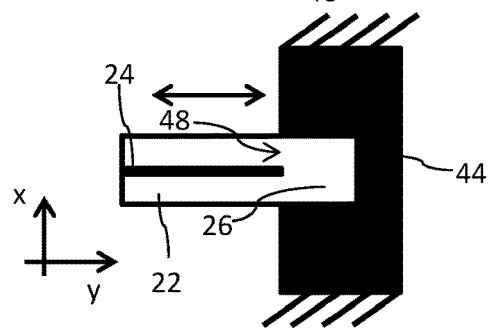
FIG. 13 shows a perspective illustration of a longitudinal guide of a longitudinal end of a bending rod on the carrier of the radiator shutter.

FIG. 13 shows a cross-section through the connection of the longitudinal end 26 of the bending rod 22 to a lateral leg 44 of the carrier 40. The leg 44 has a longitudinally extended guide groove 48, which extends parallel to the longitudinal direction of the bending rod 22. Due to the guide groove 48, which, in the example at hand, has a predetermined depth in transverse vehicle direction (y), the longitudinal end 26 of the bending rod 22 of the respective lamella 20 can be guided so as to be longitudinally displaceable on the leg 44. The bending rod 22 can thus be bent in an arcuate manner, without disengaging from the leg 44.

Figures 14, 15:
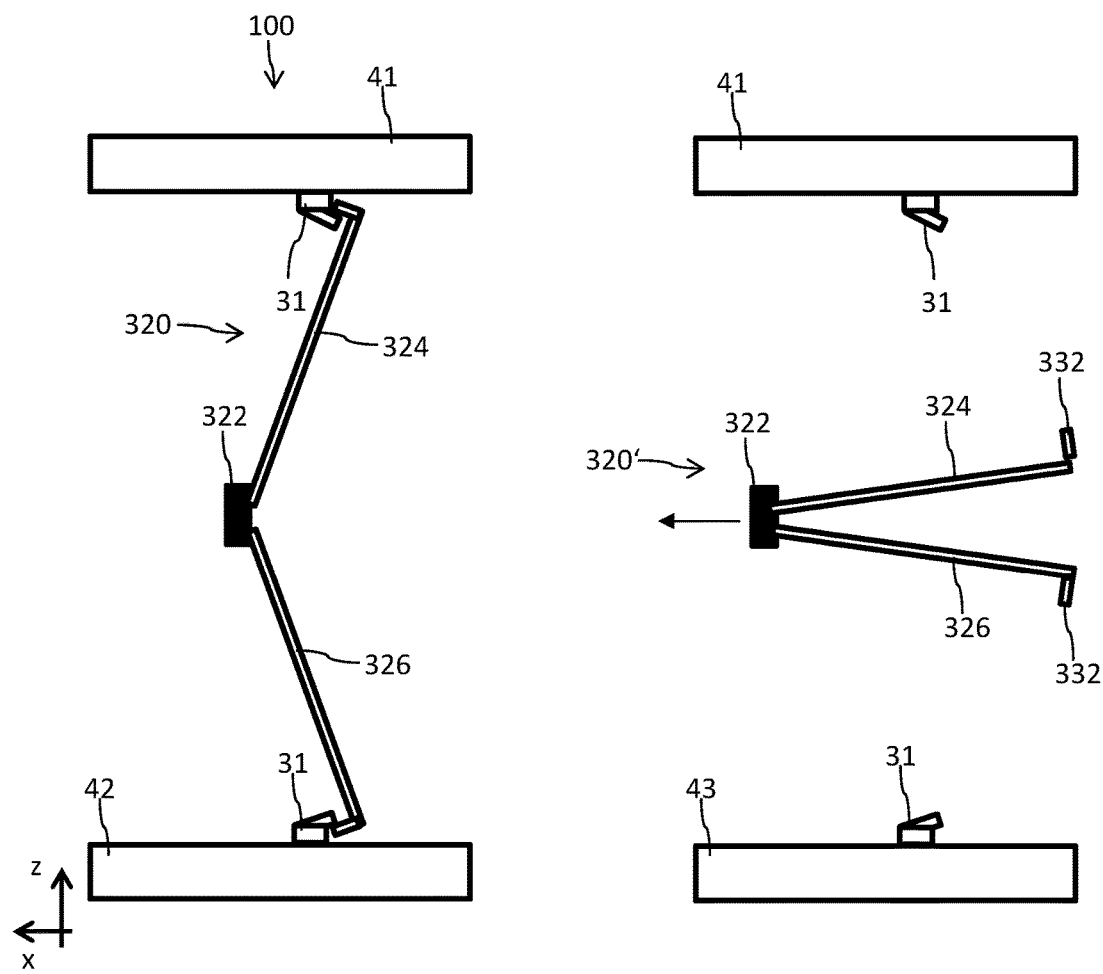
FIG. 14 shows a schematic illustration of a further exemplary embodiment of a radiator shutter including two planar segments arranged on a bending rod, in closed position.
FIG. 15 shows an illustration according to FIG. 14, but with the planar segments in open position.
Figure 16:
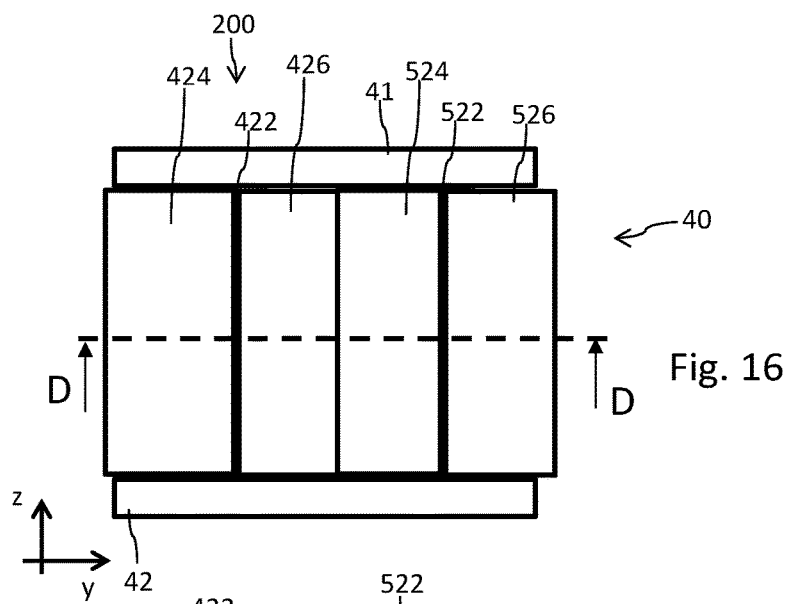
FIG. 16 shows a top view onto a further exemplary embodiment of a radiator shutter in closed position.
Figure 17:
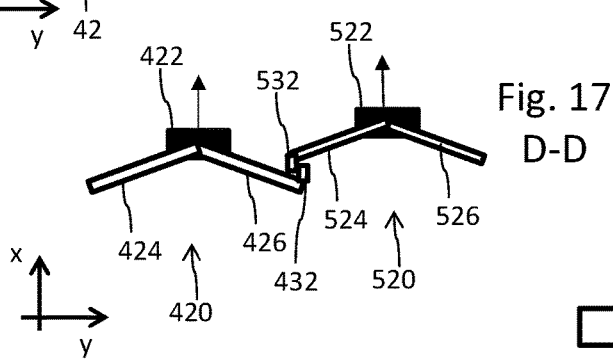
FIG. 17 shows a cross-section D-D through the radiator shutter according to FIG. 16.
Figure 18:
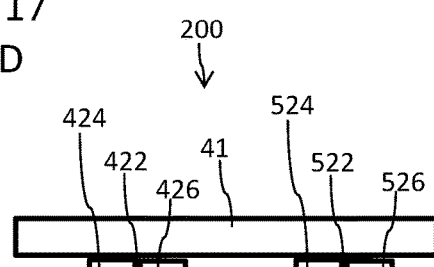
FIG. 18 shows a top view onto the radiator shutter according to FIG. 16, but with the lamellae in open position.
Figure 19:
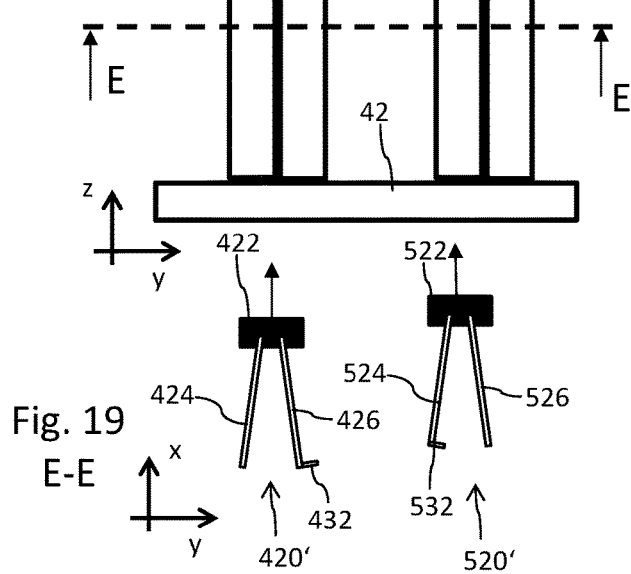
FIG. 19 shows a cross-section E-E according to FIG. 18.

FIGS. 14 and 15 show a further exemplary embodiment of a radiator shutter 100. In contrast to the embodiment according to FIGS. 7 to 12, a lamella 320 has a bending rod 322 and two planar segments 324, 326, which are arranged thereon. The planar segments 324, 326 are embodied similar to the planar segments 24, 124 or 224, which have already been described above. Due to an arcuate curvature of the bending rod 322, both planar segments 324, 326 experience a pivoting or folding movement here with the bending rod 322 as pivoting or bending axis.

In the closed position shown in FIG. 14, a connecting element 332 in each case engages with a counter connecting element 31 on the inner side of the upper leg 41 and lower leg 42 on the free side edges of the planar segments 324, 326, which face away from the bending rod 322. By a longitudinal displacement of the middle section of bending rod 322, both planar segments 324, 326 experience a respective pivoting or folding movement in opposite direction moving towards one another in a quasi-synchronous manner. The lamella 320' deformed in this manner has a cross-section of an approximately horizontal V-shaped contour, as it is shown in cross-section in FIG. 15. If the bending rod 322 is returned into the initial position according to FIG. 14 again, the planar segments 324, 326 relax back into their initial position shown in FIG. 14.

In the alternative, it is conceivable that the lamellae according to FIG. 14 are open in an unstressed initial position of the bending rod and transition into the closed position shown in FIG. 15 by a deformation of the bending rod, which is directed opposite an elastic restoring force of the bending rod. In the case of failure of the radiator shutter, the latter would be open. An overheating of the motor would be counteracted inherently.

The free ends of the planar segments 324, 326, which face away from the bending rod 322, move away from one another. The angle between the planar segments 324, 326 becomes larger. In the closed position shown in FIG. 14, it is more than 90°, preferably more than 120° or more than 140°.

The embodiment shown in FIG. 14 and in FIG. 15 has the advantage that only a single bending rod 322 is able to pivot or fold over two lamellae 324, 326 coupled thereto in a synchronous manner and in opposite direction to one another.

In the embodiment according to FIGS. 16 to 19, an orientation of lamellae 420, 520, which is rotated by 90°, is provided on the carrier 40. Based on a later mounting position in or on the motor vehicle 1, the bending rods 422, 522 of the lamellae 420, 520 run substantially along the vertical vehicle axis (z). The opposite longitudinal ends of the respective bending rods 422, 522 are connected here to the upper leg 41 and to the lower leg 42 of the carrier 40. A bending movement of the bending rods 422, 522 occurs in longitudinal vehicle direction in this exemplary embodiment of a radiator shutter 200.

Each of the two lamellae 420, 520 has a bending rod 422, 522 each and two planar segments 424, 426 or 524, 526, respectively, each. The planar segments 424, 426 are connected to the bending rod 422 analogous to the mode of operation described in FIGS. 14 and 15. The planar segments 424, 426 can be transferred from the stretched closed position shown in cross-section in FIG. 17, into a V-shaped folded-up position shown in FIG. 19 by bending the bending rod 422. In the open position of the radiator shutter 200 shown in top view in FIG. 18, air can flow through at least a partial area of the cross-sectional surface 45.

The planar segments 426, 524 of the lamellae 420, 520, which face one another, have corresponding connecting elements 432, 532. In the closure or closed position show in FIG. 17, the connecting elements 432, 532 of the planar segments 426, 524, which face one another, of the adjacently arranged lamellae 420, 520 engage with one another, so that the lamellae 420, 520 are stabilized in their closed position.

Figure 20:
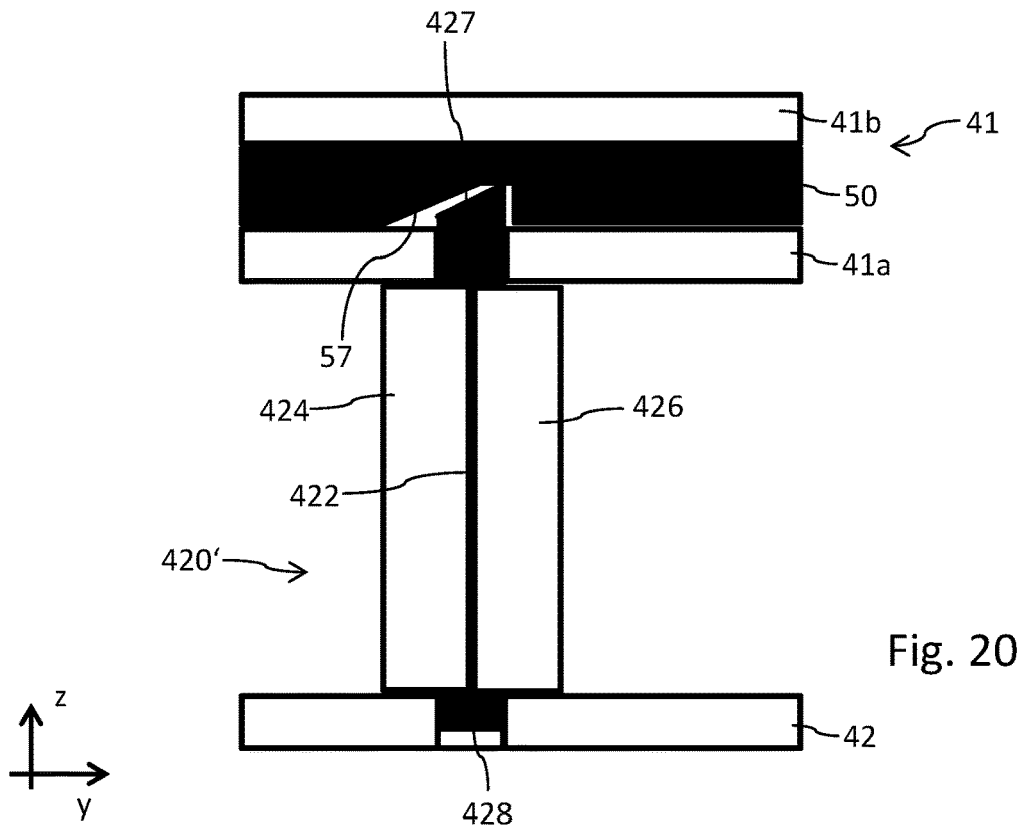
FIG. 20 shows a schematic illustration of a pressure piece for bringing about a deformation of the bending rod in an initial position.
Figure 21:
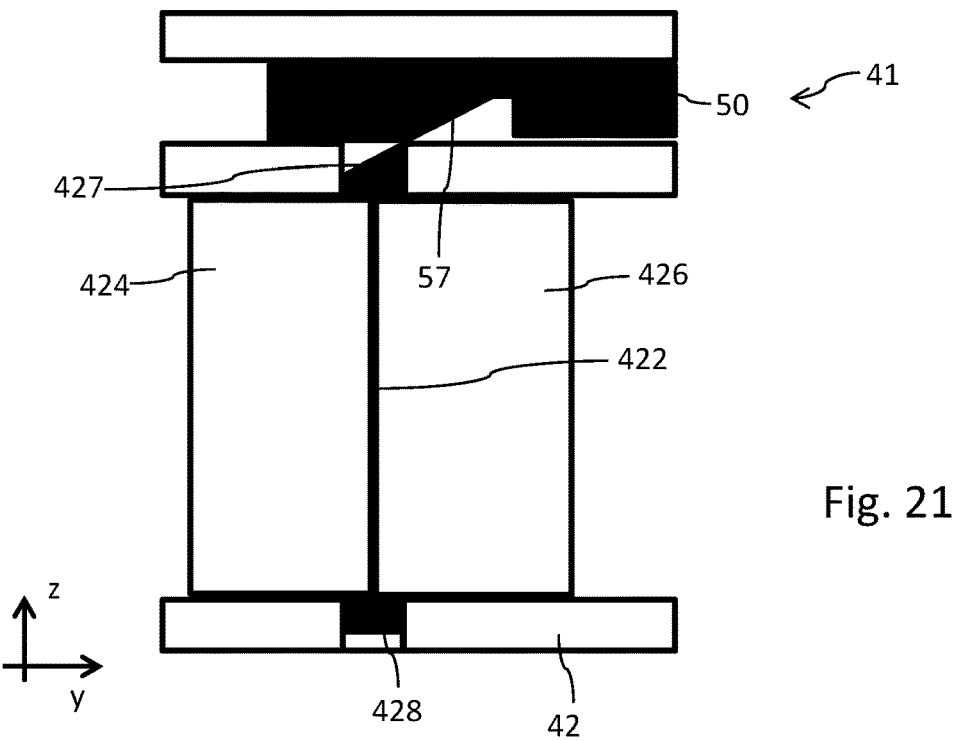
FIG. 21 shows the pressure piece in mechanical interaction with the bent bending rod.

FIGS. 20 and 21 show a further control element for deforming a bending rod 422 of a lamella 420 as needed. In the case of this embodiment, the carrier 40 has a lower leg 42 as described above, but two upper legs 41a and 41b, which run parallel to one another. A longitudinally displaceable pressure piece 50 is located between the legs 41a, 41b. The pressure piece 50 is guided in a longitudinally displaceable manner, here vertically to the longitudinal extension of the bending rod 422, in the space between the two upper legs 41a, 41b.

An upper longitudinal end of the bending rod 425 is provided with a run-on slope 427, which is embodied on an underside of the pressure piece 50 facing the leg 41a to correspond to a run-on slope 57. The longitudinal end 425 of the bending rod 422 traverses the inner upper leg 41a and comes into contact with the run-on slope of the pressure piece 50. A longitudinal extension of the pressure piece 50 has the effect that the run-on slopes 57, 427, which correspond to one another, glide past one another, whereby the bending rod 422 is subject to a compression. Due to the fact that the opposite longitudinal end 428 of the bending rod 422 is supported or fixed on the lower leg 42, the bending rod 422 responds to the compression originating from the pressure piece 50 with a predetermined bend. A corresponding pivoting or fold-over of the two planar segments 424 and 426 is the result, as follows from a comparison of FIGS. 20 and 21.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A radiator shutter for a motor vehicle, comprising:
    a carrier having a cross-sectional surface through which air can flow;
    at least one lamella arranged on the carrier and moveable between a closed position and an open position relative to the cross-sectional surface of the carrier, the lamella having a flexible and elastic bending rod and at least one planar segment;
    a control element that is guided on the carrier;
    wherein the bending rod extends along a first longitudinal axis between a first longitudinal end and a second longitudinal end, and the bending rod includes a middle section between the first and second longitudinal ends;
    wherein the first longitudinal end and the second longitudinal end are rotationally fixed relative to the carrier as the lamella moves between the closed position and the open position;
    wherein the middle section is connected to the control element to be guided on the carrier for bending the bending rod and moving the lamella between the closed position and the open position;
    wherein the planar segment transversely extends from the first longitudinal axis and has a side edge connected to the bending rod; and
    wherein the planar segment is deformable in response to elastic deformation of the bending rod.

2. The radiator shutter according to claim 1, wherein at least one of the first longitudinal end and the second end of the bending rod is guided on the carrier to be displaceable in a longitudinal direction of the bending rod.

3. The radiator shutter according to claim 1, wherein the planar segment is subject to at least one of pivoting and folding movement with respect to the first longitudinal axis as a result of a deformation of the bending rod.

4. The radiator shutter according to claim 1, wherein the middle section is deformable for at least one of a pivoting and folding over of the planar segment between the closed position and the open position.

5. The radiator shutter according to claim 4, wherein the middle section of the bending rod can be deformed in an arcuate manner with respect to the first and second longitudinal ends.

6. The radiator shutter according to claim 4, further comprising a pressure piece, which interacts with at least one of the longitudinal ends of the bending rod, is arranged on the carrier, by which the bending rod can be compressed in the longitudinal direction to affect a bending of the middle section of the bending rod.

7. The radiator shutter according to claim 1, wherein the carrier comprises a frame having a first leg and a second leg, the first longitudinal end being arranged on the first leg, the second longitudinal end being arranged on the second leg.

8. The radiator shutter according to claim 1, wherein a plurality of lamellae which are oriented parallel to one another, are arranged on the carrier, and wherein a distance between lamellae, which are adjacently arranged on the carrier, corresponds to a width or to twice the width of one of the planar segments.

9. The radiator shutter according to claim 1, wherein a connecting element for forming a releasable connection with a counter connecting element is arranged on at least one side edge of the planar segment of the at least one lamella, wherein the counter connecting element is arranged on an adjacently arranged lamella or on the carrier.

10. The radiator shutter according to claim 1, wherein two planar segments, which at least one of pivot and fold over in opposite directions as a result of a bending of the bending rod, are arranged on the bending rod.

11. The radiator shutter according to claim 1, wherein the bending rod is made of a thermoplastic plastic and wherein the planar segment is made of an organic sheet.

12. A motor vehicle comprising a body having a radiator and at least one radiator shutter according to claim 1 arranged in front of the radiator.

13. A radiator shutter for a motor vehicle, comprising:
a carrier having a cross-sectional surface through which air can flow;
a lamella supported on the carrier and movable between a closed position and an open position relative to the cross-sectional surface, the lamella including a flexible and elastic bending rod extending along a first longitudinal axis and at least one planar segment having a side edge connected to the bending rod and extending transversely from the first longitudinal axis;
a control element that is guided on the carrier;
wherein the bending rod extends along a first longitudinal axis between a first longitudinal end and a second longitudinal end, and the bending rod includes a middle section between the first and second longitudinal ends;
wherein the first longitudinal end and the second longitudinal end are rotationally fixed relative to the carrier as the lamella moves between the closed position and the open position;
wherein the middle section is connected to the control element to be guided on the carrier for bending the bending rod and moving the lamella from the closed position toward the open position, and wherein the planar segment folds in response to elastic deformation of the bending rod to move the lamella away from the closed position toward the open position and at least partially reveal the cross-sectional surface.

* * * * *